US 11,140,480 B2

(12) United States Patent
Tam

(10) Patent No.: US 11,140,480 B2
(45) Date of Patent: Oct. 5, 2021

(54) INDIRECT SOURCED COGNITIVE LOUDSPEAKER SYSTEM

(71) Applicant: Kit S. Tam, Menlo Park, CA (US)

(72) Inventor: Kit S. Tam, Menlo Park, CA (US)

( * ) Notice: Subject to any disclaimer, the term of this patent is extended or adjusted under 35 U.S.C. 154(b) by 0 days.

(21) Appl. No.: 17/028,600

(22) Filed: Sep. 22, 2020

(65) Prior Publication Data

US 2021/0092520 A1    Mar. 25, 2021

Related U.S. Application Data

(60) Provisional application No. 62/904,231, filed on Sep. 23, 2019.

(51) Int. Cl.
*G06F 3/16*       (2006.01)
*H04R 3/12*       (2006.01)
*H04L 9/32*       (2006.01)

(52) U.S. Cl.
CPC ............ *H04R 3/12* (2013.01); *G06F 3/162* (2013.01); *G06F 3/165* (2013.01); *H04L 9/3263* (2013.01)

(58) Field of Classification Search
CPC ........... H04R 3/12; G06F 3/162; G06F 3/165; H04L 9/3263
See application file for complete search history.

(56) References Cited

U.S. PATENT DOCUMENTS 6,094,671 A    7/2000  Chase et al.
RE38,405 E     1/2004  Clair, Jr. et al.
(Continued)

FOREIGN PATENT DOCUMENTS

JP    S64-044199 A    2/1989
JP    2005-079614 A   3/2005
(Continued)

OTHER PUBLICATIONS

Aiello, G. Roberto and Rogerson, Gerald D., "Ultra-Wideband Wireless Systems", pp. 36-47, IEEE Microwave magazine, Jun. 2003.
(Continued)

*Primary Examiner* — Joseph Saunders, Jr.
(74) *Attorney, Agent, or Firm* — Bever, Hoffman & Harms, LLP

(57) ABSTRACT

A system includes a CS playback device that establishes a secure communication channel with a media source device on a wireless medium, wherein the CS playback device receives and decodes a media stream transmitted from the media source device on the secure communication channel, thereby providing a decoded media stream. The CS playback device generates playback clock messages based on the decoded media stream, and transmits these playback clock messages on a wireless communication channel. One or more SPS playback devices are provided, each storing information enabling the SPS playback device to receive and decode the media stream transmitted from the media source device on the secure communication channel, whereby each SPS playback device extracts audio playback messages from the media stream. Each SPS playback device includes circuitry for receiving the playback clock messages from the wireless communication channel, and circuitry for processing the audio playback messages in response to the received playback clock messages.

22 Claims, 4 Drawing Sheets

(56) References Cited

U.S. PATENT DOCUMENTS

| | | |
|---|---|---|
| 6,757,517 B2 | 6/2004 | Chang |
| 7,539,219 B2 | 5/2009 | Kwong et al. |
| 7,684,377 B2 | 3/2010 | Lee et al. |
| 7,702,403 B1 | 4/2010 | Gladwin et al. |
| 7,805,210 B2 | 9/2010 | Cucos et al. |
| 7,940,667 B1 | 5/2011 | Coady et al. |
| 7,987,294 B2 | 7/2011 | Bryce et al. |
| 9,282,418 B2 | 3/2016 | Tam |
| 2001/0041588 A1 | 11/2001 | Holstrom et al. |
| 2002/0002039 A1 | 1/2002 | Qureshey et al. |
| 2002/0072816 A1 | 6/2002 | Shdema et al. |
| 2002/0124097 A1 | 9/2002 | Isely |
| 2003/0093669 A1 | 5/2003 | Morais et al. |
| 2003/0185542 A1 | 10/2003 | McVeigh et al. |
| 2005/0018780 A1 | 1/2005 | Kim |
| 2005/0086273 A1 | 4/2005 | Loebbert et al. |
| 2005/0113058 A1 | 5/2005 | Gosieski, Jr. |
| 2005/0177256 A1 | 8/2005 | Shintani et al. |
| 2005/0190928 A1 | 9/2005 | Noto |
| 2005/0234731 A1 | 10/2005 | Sirivara et al. |
| 2006/0126586 A1 | 6/2006 | Um et al. |
| 2007/0022207 A1 | 1/2007 | Millington |
| 2007/0121950 A1 | 5/2007 | Okaue |
| 2007/0136778 A1 | 6/2007 | Birger et al. |
| 2007/0214229 A1 | 9/2007 | Millington et al. |
| 2008/0092204 A1 | 4/2008 | Bryce et al. |
| 2008/0152165 A1 | 6/2008 | Zacchi |
| 2008/0175395 A1 | 7/2008 | Rice |
| 2008/0181424 A1 | 7/2008 | Schulein et al. |
| 2009/0164905 A1 | 6/2009 | Ko |
| 2009/0169030 A1 | 7/2009 | Inohara |
| 2009/0180465 A1 | 7/2009 | Closset et al. |
| 2009/0180631 A1 | 7/2009 | Michael et al. |
| 2009/0304194 A1 | 12/2009 | Eggleston et al. |
| 2010/0022183 A1 | 1/2010 | Ryle et al. |
| 2010/0272270 A1 | 10/2010 | Chaikin et al. |
| 2010/0299639 A1 | 11/2010 | Ramsay |
| 2011/0015769 A1 | 1/2011 | Haatainen |
| 2014/0010515 A1 | 1/2014 | Lee |
| 2014/0082396 A1 | 3/2014 | Vahidsafa et al. |
| 2014/0156103 A1 | 6/2014 | Feigenbaum |
| 2014/0205126 A1 | 7/2014 | Faranda |
| 2014/0286507 A1 | 9/2014 | Kallai et al. |
| 2015/0207877 A1 | 7/2015 | Ito |
| 2016/0105754 A1 | 4/2016 | Carlsson |
| 2017/0277507 A1 | 9/2017 | Ando |
| 2017/0303042 A1 | 10/2017 | Hammer |
| 2017/0318068 A1 | 11/2017 | Kikkerishivadatta |
| 2018/0012631 A1* | 1/2018 | Moller ................ H04N 21/4302 |
| 2018/0234936 A1 | 8/2018 | Crowe et al. |
| 2018/0246524 A1 | 8/2018 | Hillen |
| 2018/0359691 A1 | 12/2018 | Young |
| 2019/0354338 A1* | 11/2019 | Coburn, IV ....... H04N 21/4307 |
| 2019/0354339 A1* | 11/2019 | Coburn, IV ........ H04L 12/2805 |
| 2020/0022100 A1 | 1/2020 | Simon |
| 2021/0065720 A1* | 3/2021 | Dewey ..................... H04R 3/14 |
| 2021/0075533 A1 | 3/2021 | Tam |
| 2021/0160639 A1 | 5/2021 | Tam |

FOREIGN PATENT DOCUMENTS

| | | |
|---|---|---|
| JP | 2010-056970 A | 3/2010 |
| KR | 20010044634 A | 6/2001 |
| WO | 2004/034602 A1 | 4/2004 |
| WO | 2008/103091 A1 | 8/2008 |
| WO | 2008/113053 A1 | 9/2008 |
| WO | 2009/112070 A1 | 9/2009 |

OTHER PUBLICATIONS

Geer, David, "UWB Standardization Effort Ends in Controversy", pp. 13-16, IEEE Computer Society, Jul. 2006.

Mercier, Patrick P., et al., "An Energy-Efficient All-Digital UWB Transmitter Employing Dual Capacitively-Couple Pulse-Shaping Drivers", pp. 1679-1688, IEEE Journal of Solid-State Circuits, vol. 44, No. 6, Jun. 6, 2009.

Ultralink/XLO Products, Inc.,"Argentum Accourtics Cables by Ultralink/ XLO at CES 2009", 2 pages, Jan. 14, 2009.

Stadius, Kari et al., "Multitone Fast Frequency-Hopping Synthesizer for UWB Radio", pp. 1633-1641, IEEE Transactions On Microwave Theory And Techniques, vol. 55, No. 8, Aug. 2007.

Pioneer Electronics U.S.A., Elite SC-27 "7.1-Channel A/V Receiver Featuring ICEpower Class-D Amplification . . . " brochure, 2 pages, 2009.

Roy, Sumit et al., "Ultrawideband Radio Design: The Promise of High-Speed, Short-Range Wireless Connectivity", pp. 295-311, Proceedings of The IEEE, vol. 92, No. 2, Feb. 2004.

Linksys by Cisco brochure entitled "Introducing Wireless Home Audio", 7 pages, date unknown.

Yamaha MusicCAST2 MCX-RC100 and MCX-A300/MCX-P200 Owner's Manual, 20 pages, 2009.

Yamaha DME Manual; copyright 2004.

ID3 Draft specification; copyright 1968.

\* cited by examiner

INDIRECT SOURCED COGNITIVE LOUDSPEAKER SYSTEM

RELATED APPLICATION

This application claims priority from U.S. Provisional Patent Application 62/904,231, entitled "Indirect Sourced Cognitive Loudspeaker System", which was filed on Sep. 23, 2019, and is incorporated by reference herein.

FIELD OF THE INVENTION

The present invention relates to a cognitive loudspeaker system capable of being indirectly sourced from a conventional mobile device, and methods for implementing the same.

RELATED ART

Mobile devices (such as cell phones, tablets and laptops) and smart home devices (such as Amazon Alexa and Google Nest), have become the de-facto instruments for the transport and storage of media. Due to form factor limitations, audio from these devices is played back using headphones or a loudspeaker installed in the device, which has compromised sound quality. It is difficult to playback multiple channel audio associated with the latest blockbuster movies using these mobile devices. Moreover, these mobile devices typically have a relatively small screen for video playback.

Many products are available that allow mobile device users to stream media wirelessly from a mobile device to another fixed location device at home for a better experience. Examples include: Wireless Display, Google cast, Audio Processor and Bluetooth Audio devices (such as Bluetooth speakers and sound bars). These products only provide the transport service from the mobile device to the playback devices. The playback devices still implement conventional audio technologies such as: a multi-channel analog system, a single speaker box with some signal processing capability, or Bluetooth Audio (which provides poor sound quality due to the limited bit rate and stereo-only playback).

New media technologies and formats require better audio playback system technologies in order to provide the intended user experiences. Examples include 4k televisions (and beyond), new sound technologies, such as "Dolby Atmos" and studio quality music streams such as "Tidal".

U.S. Pat. No. 9,282,418 (the '418 Patent) describes a Cognitive Loudspeaker System (CLS) that includes an active control station (CS) that communicates wirelessly and bi-directionally with one or more sound production stations (SPSs). During a setup process, configuration information is transmitted from the sound production stations to the active control station. In response to the received configuration information, the active control station generates playback executables for each of the sound production stations. The active control station wirelessly transmits the playback executables to the sound production stations. After the setup process is complete, the active control station wirelessly transmits digital audio information (which is received from a digital audio source) to the sound production stations. Within each sound production station, the previously received playback executable is used to control the decoding and processing of the received digital audio information. Each sound production station generates digital audio output samples in response to the received digital audio information (and the associated playback executable). The digital audio samples are converted to an analog output signal, which is amplified and played through a speaker. Thus, the active control station establishes a virtual decoder within each of the sound production stations, which enables playback from various sources. The virtual decoder allows the cognitive loudspeaker system to be easily modified/updated to handle new coding protocols.

Conventional mobile devices are not currently designed to operate as control stations in the cognitive loudspeaker system as described by the '418 Patent, and it is unreasonable to believe that all mobile devices will be redesigned to operate in this manner in the future. That is, conventional mobile devices are not 'plug and play' with respect to the cognitive loudspeaker system described by the '418 Patent.

As an alternative, a conventional mobile device could wirelessly transmit a playback stream to a control station as described by the '418 Patent, and the control station could re-transmit the playback stream to sound production stations in the manner described by the '418 Patent. However, this alternative would incur extra latency from the mobile device to the playback of the audio stream. This latency is not acceptable, especially if the audio playback stream is accompanied with a video playback stream. In addition, the required transmission of the playback stream by both the mobile device and the control station undesirably consumes extra bandwidth of the associated wireless medium, undesirably causing the mobile device and the cognitive loudspeaker system to compete for the wireless medium resources.

It would therefore be desirable to have an improved cognitive loudspeaker system capable of being indirectly sourced from a conventional mobile device, while overcoming the problems described above.

SUMMARY

Accordingly, the present invention includes a cognitive loudspeaker system that includes a control station (CS) playback device that establishes a secure communication channel with a conventional media source device on a wireless medium. The CS playback device receives and decodes a media stream transmitted from the media source device on the secure communication channel. The CS playback device generates playback clock messages based on the decoded media stream, and transmits these playback clock messages on a wireless communication channel.

The cognitive loudspeaker system also includes one or more sound production station (SPS) playback devices, each storing information that enables the corresponding SPS playback device to receive and decode the media stream transmitted from the media source device on the secure communication channel. Each SPS playback device extracts audio playback messages from the received media stream. Each SPS playback device also receives the playback clock messages transmitted by the CS playback device on the wireless communication channel. Each SPS playback device processes the received audio playback messages in response to the received playback clock messages, whereby playback of the audio playback messages are synchronized by the received playback clock messages.

In accordance with one embodiment, the CS playback device includes a circuit for generating a local clock signal used for playback of the decoded media stream within the CS playback device, wherein CS playback device generates the playback clock messages in response to the local clock signal. In accordance with a particular embodiment, each SPS playback device uses the received playback clock messages to synchronize playback of the audio playback messages with the local clock signal of the CS playback device.

In accordance with a specific embodiment, the information enabling the SPS playback devices to receive and decode the media stream transmitted from the media source device on the secure communication channel comprises secrets of the CS playback device required to establish the secure communication channel with the media source device on the wireless medium. In an alternate embodiment, the information enabling the SPS playback devices to receive and decode the media stream transmitted from the media source device on the secure communication channel comprises a session key created by the CS playback device and the media source device when establishing the secure communication channel on the wireless medium.

The present invention also includes a method that includes: establishing a secure communication channel between a media source device and control station (CS) playback device on a wireless medium; receiving a media stream transmitted from the media source device on the secure communication channel with the CS playback device; decoding the received media stream with the CS playback device, thereby providing a decoded media stream; generating playback clock messages with the CS playback device based on the decoded media stream; storing information in one or more sound production station (SPS) playback devices that enables the SPS playback devices to receive and decode the media stream transmitted from the media source device on the secure communication channel; receiving the media stream transmitted from the media source device on the secure communication channel with the SPS playback devices; decoding the received media stream in the SPS playback devices, thereby providing audio playback messages; and processing the audio playback messages within the SPS playback devices in response to the playback clock messages generated by the CS playback device.

In accordance with one embodiment, the method further includes generating the playback clock messages in response to a local clock signal derived from the decoded media stream. In a specific embodiment, the playback of the audio playback messages is synchronized with the local clock signal in the SPS playback devices.

In accordance with a specific embodiment, the information enabling the SPS playback devices to receive and decode the media stream transmitted from the media source device on the secure communication channel comprises secrets of the CS playback device required to establish the secure communication with the media source device on the wireless medium. In an alternate embodiment, the information enabling the SPS playback devices to receive and decode the media stream transmitted from the media source device on the secure communication channel comprises a session key created by the CS playback device and the media source device when establishing the secure communication channel on the wireless medium.

Advantageously, the cognitive loudspeaker system of the present invention is capable of operating in response to media streamed from a conventional media source device, without incurring any extra latency from the media source device to the audio playback. In addition, this cognitive loudspeaker system advantageously consumes very little bandwidth in the wireless medium during playback, because the CS playback device does not need to retransmit the media stream to the SPS playback devices.

The present invention will be more fully understood in view of the following description and drawings.

DETAILED DESCRIPTION

Figure 1:
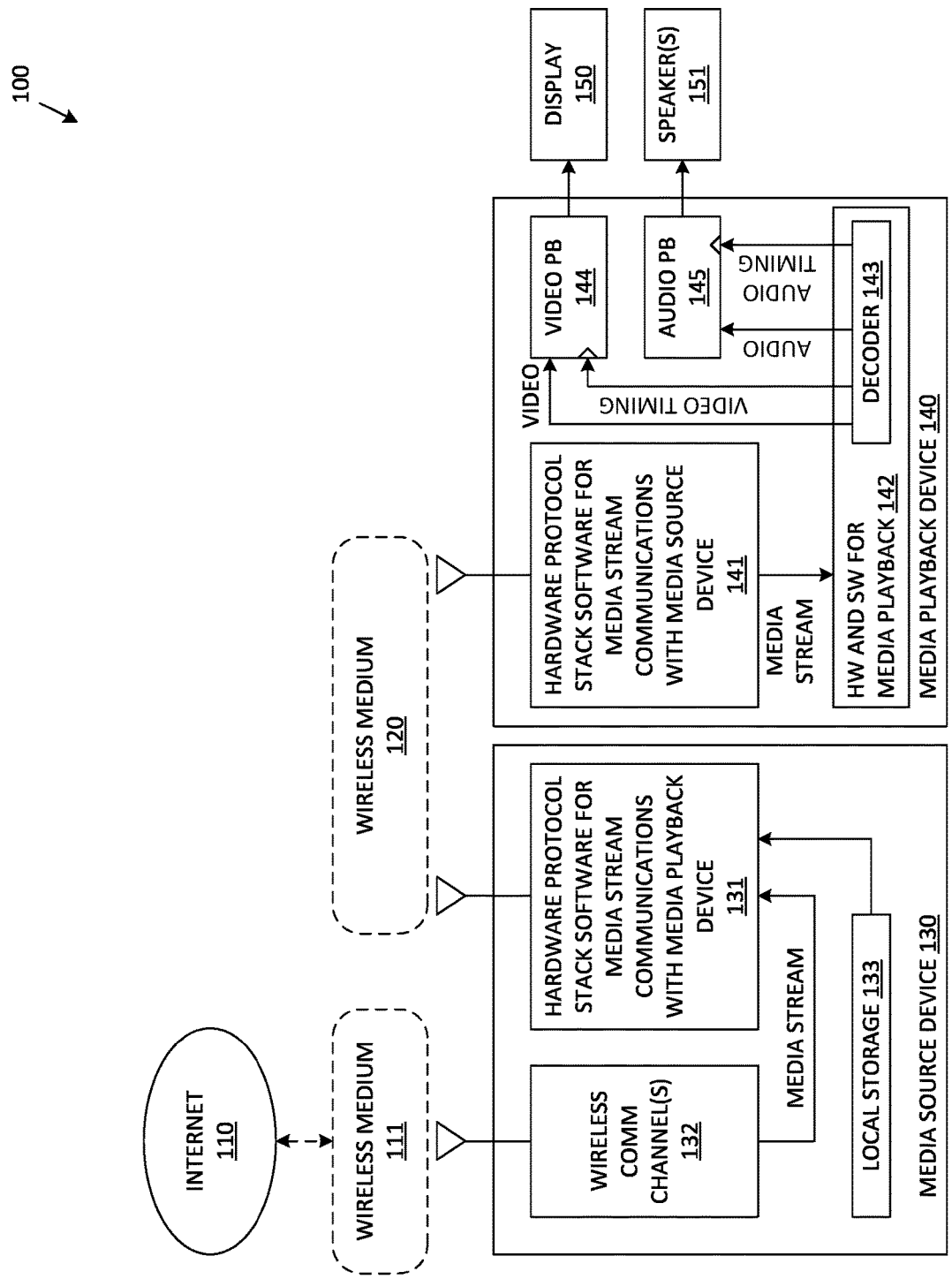
FIG. 1 is a block diagram of a conventional playback system that includes a media source device and a media playback device.

FIG. 1 is a block diagram of a conventional playback system 100, wherein a media playback stream is sourced from a media source device 130 to a media playback device 140 over a wireless medium 120.

Media source device 130 can be, for example, a smart phone, a laptop or a smart home device. Media source device 130 communicates with media playback device 140 via a specific standardized wireless medium 120. Examples of wireless medium 120 include Bluetooth or WiFi (in accordance with IEEE wireless standard 802.11). Media source device 130 and media playback device 140 include corresponding hardware, protocol and stack software 131 and 141, respectively, which are provisioned for wireless communication on wireless medium 120.

Media source device 130 also includes other wireless communication channel(s) 132, which provide access to another wireless medium 111 (e.g., a 5G cell phone network) for other communication purposes. The wireless medium 120 for the media stream transport can be different than the wireless medium 111.

Media source device 130 may provide the media stream from the Internet 110 (via wireless medium 111 and wireless communication channel(s) 132, or from local storage 133. The media playback stream is a normally standardized formatted stream such as an MPEG4 stream, a Dolby Atmos stream or a pulse code modulation (PCM) stream.

Media playback device 140 is responsible for converting the media playback stream received from the media source device 130 on the wireless medium 120 into video and audio output signals, which are transmitted to video display 150 and speaker(s) 151, respectively. The media playback device 140 is provisioned with the hardware and software for media playback 142, which includes a decoder 143 that converts the media playback stream received from the media source device 120 into audio and video signals, as well as corresponding audio and video timing signals. The video signal and the video timing signal are provided to video playback circuit 144, which processes these signals to provide a synchronized video output signal to display 150. Similarly, the audio signal and the corresponding audio timing signal are provided to audio playback circuit 145, which processes these signals to provide a synchronized audio signal to speaker(s) 151. Media playback device 140 may include connectors, such as HDMI or RCA connectors, for providing the synchronized video and audio signals to video display 150 and speaker(s) 151, respectively (e.g., if media playback device 140 is an audio/video processor). Examples of media playback device 140 include smart televisions, smart speakers, soundbars and audio/video (A/V) processors.

Communication between the media source device 130 and the media playback device 140 is based on the service of the peer-to-peer network in the standardized wireless medium 120. This is 'point-to-point' communication, which can be implemented using, for example, WiFi based on the IEEE 802.11 Standard, "Wireless Display (Miracast)", or Google Cast. The communication is enabled by the hardware, protocol and software stacks 131 and 141, which provide the following services: discovery, association, authentication, data transport services, and disassociation.

When wireless medium 120 is implemented using WiFi, the 802.11 IEEE standard specifies the PHY and MAC layers. An application specified wireless network is deployed. Examples include: (1) a direct link setup (wherein devices setup communication through their associated Access Point (Miracast), (2) an Independent Basic Service Set (IBSS), which is not connected to the Distribution System (Internet), and includes a custom protocol stack above the MAC layer, and (3) a Mesh Basic Service Set (MBSS).

The IEEE 802.11 standard implements Robust Security Network Association (RSNA), which includes a shared master key between the communication pairs. The security requirement for master key distribution for the Home Audio System should be much lower than the normal WiFi LAN application. RSNA also includes an established session key and cipher suite that uses: the master key, the MAC addresses, nonces, some other initialization vectors from both parties, and the 4 ways messages exchange. Security data communications between the two parties using the session key and chosen cipher suites include: Temporary Key Integrity Protocol (TKIP) and CTR with CBC-MAC Protocol (COMP).

Security for wireless communication is of the utmost importance. For this reason, all the wireless communication standards, including the IEEE 802.11 Standard, are provisioned with capabilities for secure communications. In general, the communicating parties establish a secure communication channel that derives the keys used for secure communication using common secrets. Each communicating party has secrets that are used to establish the secure communication channel via a message exchange protocol. Examples include dynamic variables such as nonce, and counter values, static state variables such as a MAC address, and 4 ways messages exchange specified in the IEEE 802.11 standard. The values required by a device to secure a communication channel via a message exchange protocol on the wireless medium 120 are herein referred to generically as the 'secrets' of the device.

The communicating parties 130 and 140 exchange messages including the secrets described above to establish a session key for a secure communication channel on wireless medium 120. It is very difficult for a third party to understand the actual content of the exchanged messages, even if the third party receives every message from the two communicating parties (because the third party cannot determine the session key). More specifically, the third party cannot derive the session key from the exchanged messages because the third party does not know the secrets of either of the two communicating parties.

In accordance with one embodiment of the present invention, which is described in more detail below, if a third party knows the secrets of one of the communicating parties 130 and 140, the third party can determine the session key by monitoring the message exchange used to establish the secure communication channel. Under these conditions, the third party can become able to understand the secure communications between the communicating parties 130 and 140. As described in more detail below, this process is used to enable the setup of a cognitive loudspeaker system that can play a media stream from a conventional mobile device.

Figure 2:
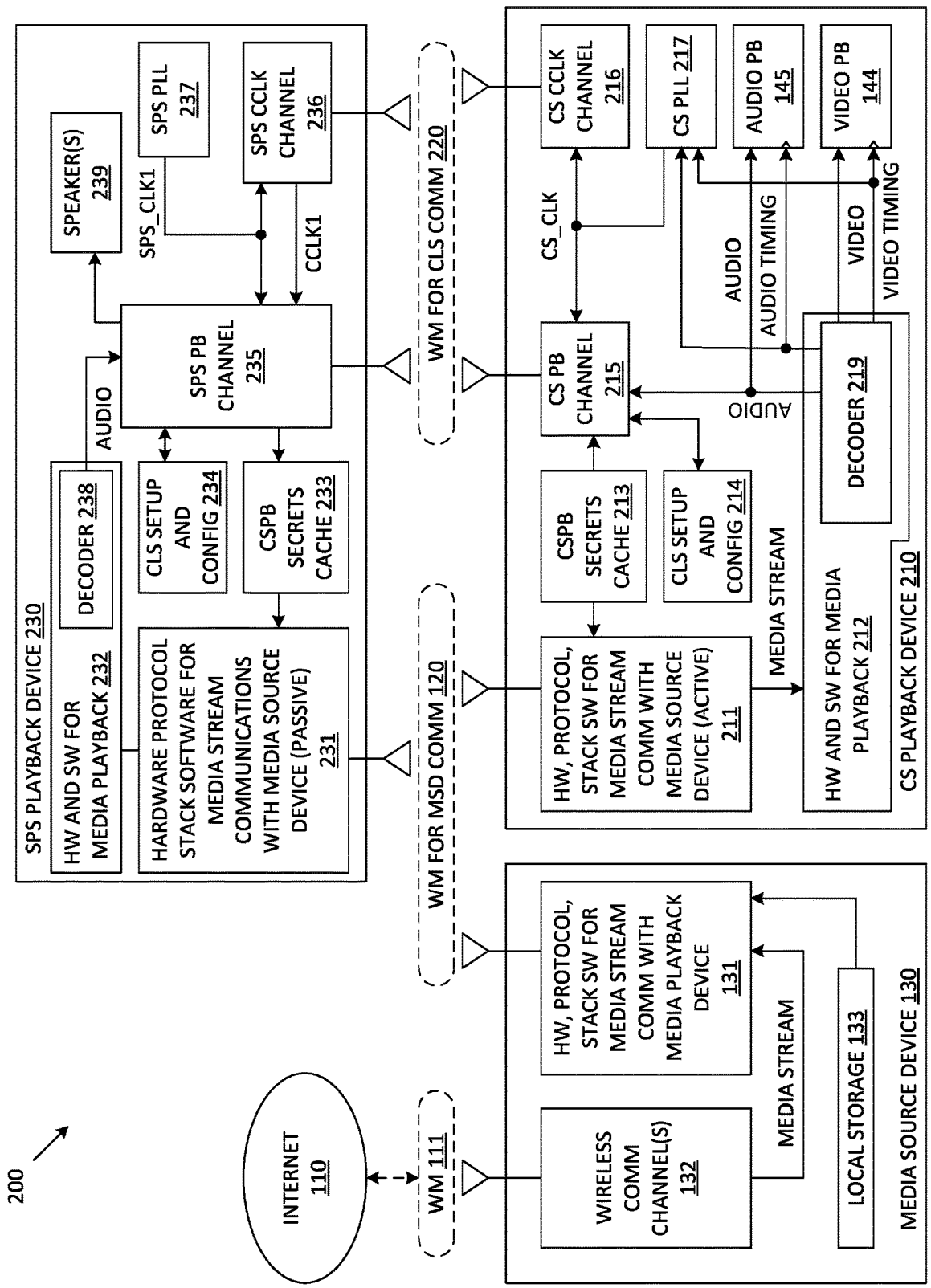
FIG. 2 is a block diagram of a media playback system including a media playback device, a control station (CS) playback device and a sound production station (SPS) playback device in accordance with one embodiment of the present invention.

FIG. 2 is a block diagram of a media playback system 200 in accordance with one embodiment of the present invention. Similar elements in media playback system 200 and conventional playback system 100 are labeled with similar reference numbers. Thus, media playback system 200 includes Internet 110, wireless medium 111, wireless medium 120 and media source device 130 (including hardware, protocol and stack software 131, wireless communication channel(s) 132 and local storage 133), which have been described in detail in connection with FIG. 1.

Media playback system 200 also includes control station (CS) playback device 210, sound production station (SPS) playback device 230 and wireless medium (WM) 220, which is used for communications between CS playback device 210 and SPS playback device 230. Although only one SPS playback device is illustrated in FIG. 2, it is understood that additional SPS playback devices similar to SPS playback device can be included in system 200. For example, one SPS playback device may be used to playback right channel audio signals and another SPS playback device may be used to playback left channel audio signals.

In general, functions of the media source device 130 include: (1) establishing a secure communication channel with the CS playback device 210 (via wireless medium 120), and (2) sending a media playback stream to the CS playback device 210 on the established secure communication channel.

In general, functions of the CS playback device 210 include: (1) establishing the configuration and setup of a cognitive loudspeaker system with SPS playback device 230, (2) sharing the secrets of the CS playback device 210 used to establish a secure communication channel with the media storage device 130 on the wireless medium 120 with the SPS playback device 230, (3) establishing a secure communication channel (e.g., establishing a session key) with the media source device 130 on the wireless medium 120 by exchanging messages that include the secrets of the CS playback device 210, and (4) generating and broadcasting clock control messages to the SPS playback device 230, based on a local clock signal CS_CLK. The characteristics (e.g., frequency and timing) of the CS_CLK signal are selected based on the audio and video timing specifications of the media stream processed by CS playback device 210.

In general, functions of the SPS playback device 230 include: (1) establishing the configuration and setup of the cognitive loudspeaker system with the CS playback device 210, (2) receiving the secrets of the CS playback device 210 required to establish a secure communication channel on wireless medium 120, (3) monitoring communication channel setup messages exchanged between the media source device 130 and the CS playback device 210 (on wireless medium 120), (4) using the secrets of the CS playback device 210 and the monitored communication channel setup messages to independently determine the session key for the secure communication channel between the media source device 130 and the CS playback device 210, (5) passively monitoring communications between the media source device 130 and the CS playback device 210 (whereby the SPS playback device 230 captures the playback media stream transmitted on wireless medium 120 by media source device 130), and (6) processing the playback media stream received from the media source device 130 in response to the clock control messages transmitted by the CS playback device.

The operation of media playback system 200 will be described in more detail below.

As illustrated in FIG. 2, CS playback device 210 includes hardware, protocol and stack software 211, which enables media stream communications with media source device 130 via wireless medium 120. CS playback device 210 also includes hardware and software for media playback 212 (including media stream decoder 219), a cache 213 for storing the secrets used by the CS playback device 210 to establish a secure communication channel on wireless medium 120, cognitive loudspeaker system setup and configuration logic 214, CS playback channel circuit 215, CS control clock channel circuit 216, and CS phase locked loop (PLL) circuit 217. CS playback device 210 also includes video playback circuit 144 and audio playback circuit 145, which have been described above in connection with FIG. 1. In one embodiment, and video playback circuit 144 sends synchronized video output signals to corresponding display 150 (not shown in FIG. 2) and audio playback circuit 145 sends synchronized audio output signals to corresponding speaker(s) 151 (not shown in FIG. 2). Although the speaker(s) 151 and display 150 are external to CS playback device 210 in FIG. 2, it is understood that in other embodiments, speaker(s) 151 and display 150 may be included in CS playback device 210 (e.g., if CS playback device 210 is a smart TV).

SPS playback device 230 includes hardware, protocol and stack software 231, which enables the SPS playback device 230 to receive the media stream transmitted by the media source device 130 via wireless medium 120. SPS playback device 230 also includes hardware and software for media playback 232 (including media stream decoder 238), a cache 233 for storing the secrets used by the CS playback device 210 to establish a secure communication channel on wireless medium 120, cognitive loudspeaker system setup and configuration logic 234, SPS playback channel circuit 235, SPS control clock channel circuit 236, SPS clock PLL circuit 237 and speaker(s) 239. Although speaker(s) 239 are shown as part of the SPS playback device 230 in FIG. 2, it is understood that in other embodiments, speaker(s) 239 may be stand-alone devices external to SPS playback device 230.

CLS Configuration

In accordance with one embodiment of the present invention, CS playback device 210 and SPS playback device 230 communicate bi-directionally on wireless medium 220 to setup and configure a cognitive loudspeaker system as described in the '418 Patent, which is hereby incorporated by reference in its entirety. A general description of the setup and configuration of this cognitive loudspeaker system will now be provided.

Figure 3:
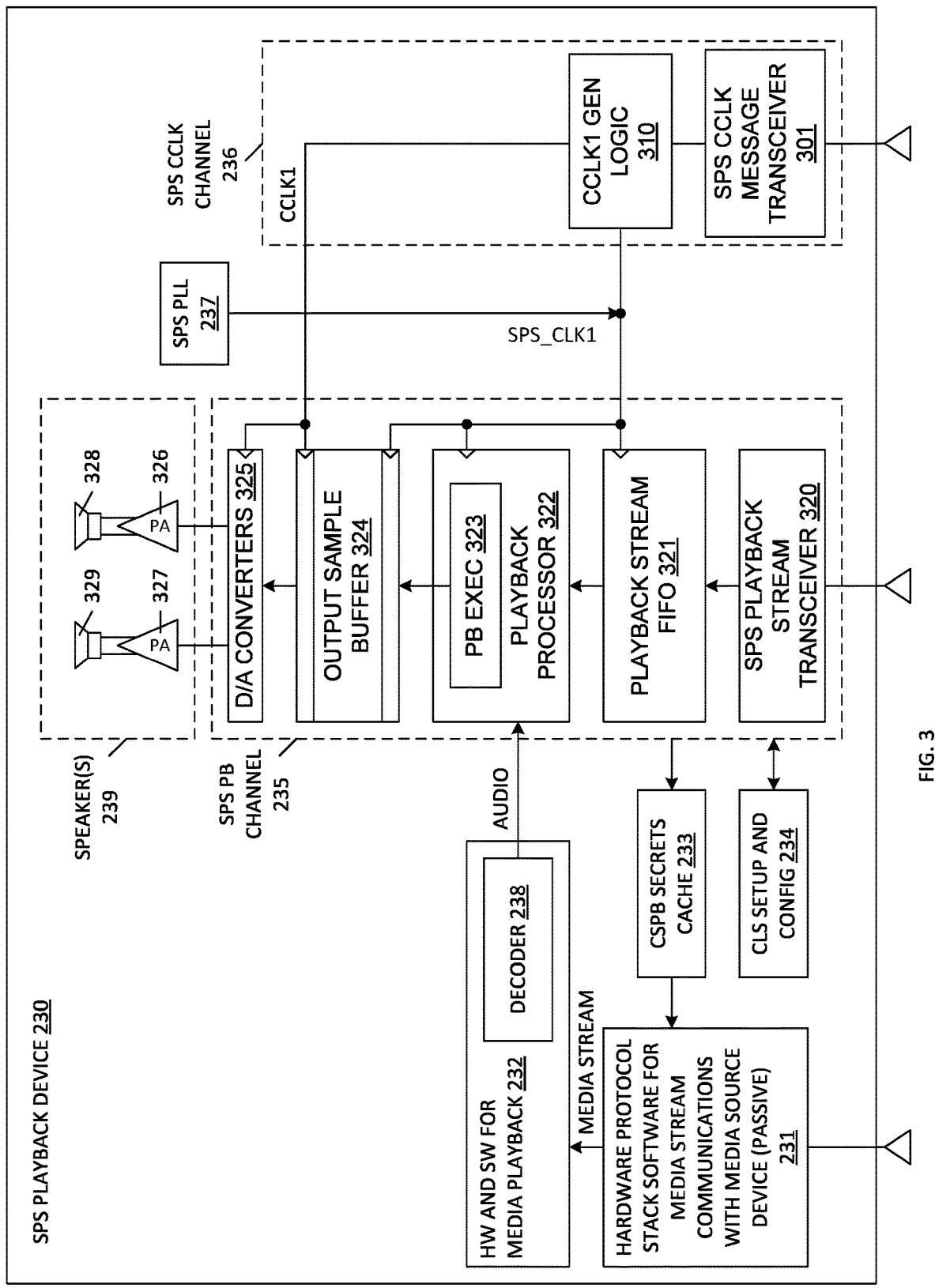
FIG. 3 is a block diagram illustrating the SPS playback device of FIG. 2 in more detail in accordance with one embodiment of the present invention.

FIG. 3 is a block diagram illustrating the SPS playback device 230 in more detail in accordance with one embodiment of the present invention. As illustrated, SPS playback channel circuit 235 includes SPS playback stream transceiver 320, playback stream FIFO memory 321, playback processor 322, output sample buffer 324, and digital to analog (D/A) converters 325. SPS control clock channel circuit 236 includes SPS control clock message transceiver 301, and local conductor clock (CCLK1) generation logic 310. Speaker(s) 239 include power amplifiers 326-327 and loudspeakers 328-329

During the cognitive loudspeaker system setup process, configuration information (stored in CLS setup and configuration circuit 234) is transmitted from the SPS playback device 230 to the CS playback device 210 (i.e., from SPS playback stream transceiver 320 to CS playback channel circuit 215 over wireless medium 220). In response to the received configuration information (and other system information), the CLS setup and configuration circuit 214 generates a corresponding playback executable 323 for the SPS playback device 230. The CLS setup and configuration circuit 214 wirelessly transmits the playback executable to SPS playback device 230 (i.e., from CS playback channel circuit 215 to SPS playback stream transceiver 320 over wireless medium 220). In response, SPS setup and configuration circuit 234 installs the received playback executable 323 in the playback processor 322. The playback executable 323 is used to control the decoding and processing of digital audio information within the playback processor 322. As described in more detail below, digital audio information (in the form of audio playback messages) is provided to the playback processor 322 by the playback stream FIFO 321, either directly from CS playback device 210, or indirectly from media source device 130.

The cognitive loudspeaker system established between CS playback device 210 and SPS playback device 230 also includes controls to ensure for clock synchronization between these devices (as well as between other SPS playback devices, similar to SPS playback device 230, which are typically included in the cognitive loudspeaker system). This clock synchronization is described in more detail in U.S. patent application Ser. No. 16/563,469 (hereinafter referred to as the '469 Application), which is hereby incorporated by reference in its entirety.

In a direct communication mode (described in more detail below), playback stream FIFO 321 receives and stores audio playback messages received from CS playback device 210 ahead of a playback schedule. These audio playback messages are read from FIFO memory 321 and provided to playback processor 322 in response to a local clock signal SPS_CLK1, which is generated by local SPS PLL circuit 237. The amount of time that the playback messages are transmitted ahead of schedule is a design choice, which depends on the size of FIFO memory 321 and the flow control policy adopted for the audio playback messages.

Playback processor 322 processes the audio playback messages in accordance with the programmable playback executable 323. Programmable playback executable 323 enables playback processor 322 to decode digital audio information for its designated audio channel using different coding protocols. Playback processor 322 is clocked by the local clock signal SPS_CLK1. Playback processor 322 generates digital audio samples in response to the received audio playback messages. These digital audio samples are written to output sample buffer 324 in response to the local SPS_CLK1 signal. The digital audio samples stored in output sample buffer 324 are read out and provided to digital-to-analog converters (DACs) 325 in response to a local conductor clock signal CCLK1 provided by SPS conductor clock channel circuit 236. DACs 325 convert the digital audio samples to analog audio signals, which are transmitted to power amplifiers 326-327 and loudspeakers 328-329. DACs 325 also operate in response to the local conductor clock signal CCLK1. As described in the '469 Application, the local conductor clock signal CCLK1 is precisely synchronized to a specified edge of the CS_CLK signal generated within CS playback device 210. Note that local conductor clock signals in other SPS playback devices (not shown in FIG. 2) are similarly synchronized to the same specified edge of the CS_CLK signal of CS playback device 210.

Within CS playback device 210, the CS PLL 217 generates the CS_CLK signal based on the audio and video timing specifications of the media stream processed by CS playback device 210. Note that the CS_CLK signal is used to control the timing of CS conductor clock channel circuit 216 and CS playback channel circuit 215 within CS playback device 210.

In general, the local conductor clock signal CCLK1 is synchronized with the CS_CLK signal as follows. CS conductor clock channel 216 generates conductor clock messages in response to the CS_CLK signal, and transmits these conductor clock messages to the SPS conductor clock message transceiver 301 of SPS conductor clock channel circuit 236 via wireless medium 220 (which can include, for example, WiFi in accordance with the IEEE 802.11 standard, or the ultra-wide band (UWB) frequency spectrum). SPS conductor clock message transceiver 301 transmits the received conductor clock messages to conductor clock (CCLK1) generation logic 310. In response, conductor clock generation logic 310 generates the local conductor clock signal CCLK1, wherein the local conductor clock signal CCLK1 is synchronous with a specified edge of the received CS_CLK signal. More specifically, rising edges of the local conductor clock signal CCLK1 are asserted when a modulo counter within CS conductor clock channel circuit 216 (which is clocked by the CS_CLK signal) becomes full. This is accomplished by including a conductor clock trigger delay value in the conductor clock message, wherein the conductor clock trigger delay value specifies a number of cycles of the CS_CLK signal until the modulo counter becomes full. CCLK1 generation circuit 310 converts the conductor clock trigger delay value from a number of cycles of the CS_CLK signal to a number of cycles of the SPS_CLK1 signal (using a determined frequency ratio of the CS_CLK signal to the SPS_CLK1 signal). In addition, the transmission delay (in SPS_CLK1 cycles) from the CS playback device 210 to the SPS playback device 230 on wireless medium 220 is determined. CCLK1 generation circuit 310 performs a countdown in response to the SPS_CLK1 signal, starting from a value equal to: the number of cycles of the SPS_CLK signal until the modulo counter becomes full, plus the number of SPS_CLK1 cycles of the transmission delay. When the countdown is complete, a rising edge of the CCLK1 is asserted, such that the CCLK1 signal is synchronized with the edge of the CS_CLK signal that causes the modulo counter to become full.

Figure 4:
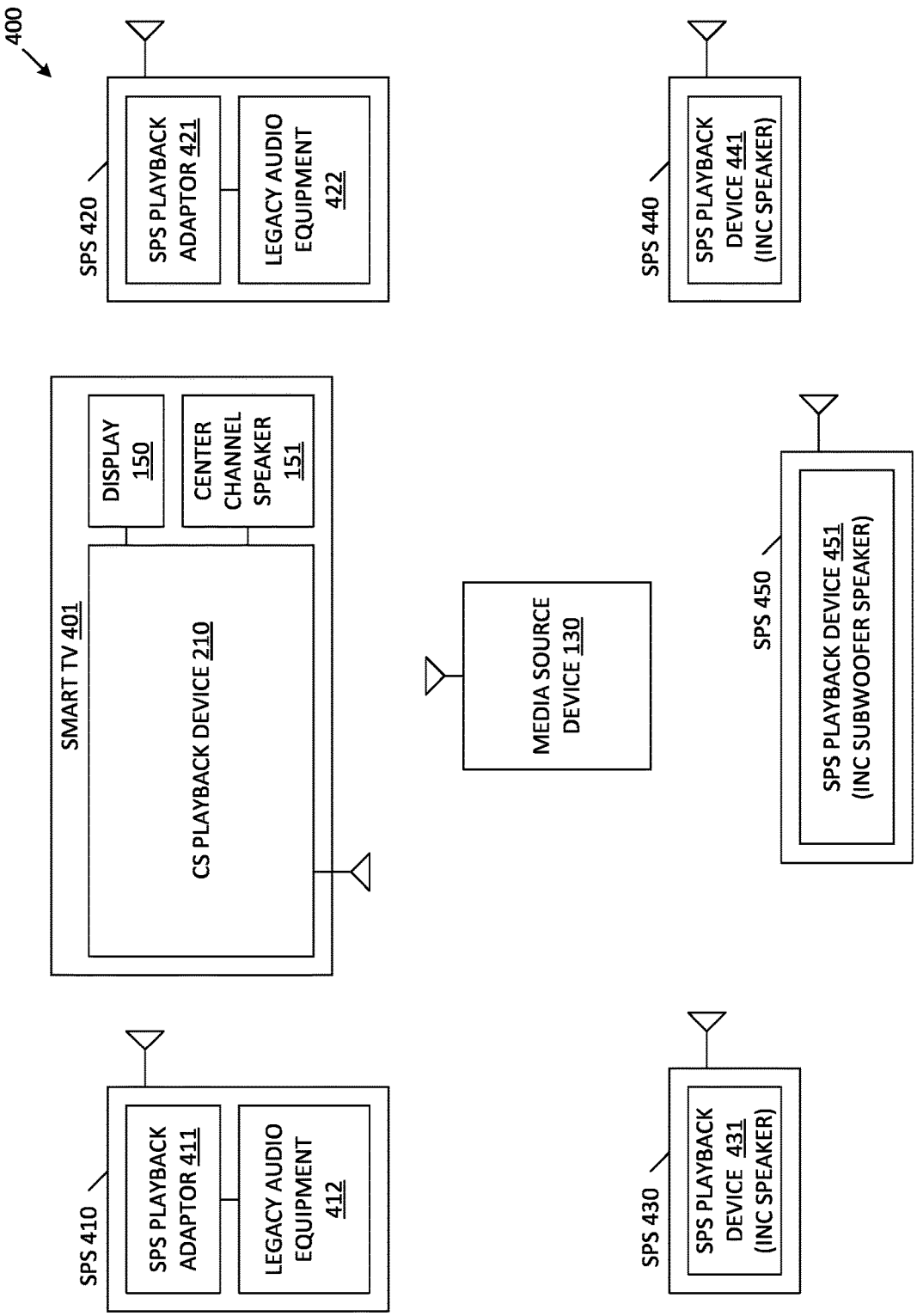
FIG. 4 is a block diagram of a 5.1 surround sound system that includes a media source device, a Smart TV that implements a CS playback device, and sound production stations that implement SPS playback devices in accordance with one embodiment of the present invention.

Although only one SPS playback device 230 is illustrated in FIG. 2, it is understood that additional SPS playback devices can be configured to operate with CS playback device 210 in the established cognitive loudspeaker system (see, e.g., FIG. 4). Each of these additional SPS playback devices include circuitry similar to SPS playback device 230 to generate a corresponding local conductor clock signal (e.g., CCLK2, CCLK3) that is synchronized with the specified edge of the CS_CLK signal (taking transmission delays into account), thereby ensuring that audio playback is synchronized across all SPS playback devices.

Also during the cognitive loudspeaker system setup and configuration process, the secrets of the CS playback device 210 are retrieved from cache 213 of CS playback device 210, and are transmitted to SPS playback device 230 (via CS playback channel 215 circuit, wireless medium 220 and SPS playback channel circuit 235). Within SPS playback device 230, the secrets of the CS playback device 210 are stored in cache 233 for future use. Note that the secrets of the CS playback device 210 must be provided to SPS playback device 230 before indirect playback from the media source device 130 can be performed. More specifically, the secrets of the CS playback device 210 must be available to the SPS playback device 230 before a secure communication channel is established between the media source device and the CS playback device 210 on wireless medium 120. As described in more detail below, the secrets of the CS playback device 210 enable the SPS playback device 230 to understand communications between the media source device 130 and the CS playback device 210.

After setup and configuration of the cognitive loudspeaker system is completed, two modes of operation are possible: (1) direct communication within the cognitive loudspeaker system, and (2) indirect communication using the media source device 130.

Direct Communication Mode

In the direct communication mode, the CS playback device 210 and the SPS playback device 230 operate in the manners described by the '418 Patent and the '469 Application. That is, the CS playback device 210 sources audio playback messages, which are transmitted to SPS playback device 230 for audio playback. Note that the CS playback device 210 transmits the audio playback messages from CS playback channel circuit 215 to SPS playback channel circuit 235 (based on the CS_CLK signal) over wireless medium 220. The CS playback device 210 may source the audio messages from various sources, including a cable service provider, a DVD or BluRay player, or a local storage device (not shown). However, the CS playback device 210 does not receive the audio messages from the media source device 130 during the direct communication mode.

As described above, the CS playback device 210 transmits clock control messages to the SPS playback device 230 based on the CS_CLK signal. The SPS playback device 230 generates the local conductor clock CCLK1 in response to the received clock control messages (and the SPS_CLK1 signal) to synchronize the playback of the audio playback messages within the SPS playback device 230.

In the direct communication mode, the playback of the audio stream from the CS playback device 210 to the SPS playback device 230 is necessarily delayed, due to the requirements of transmitting audio playback messages from the CS playback device 210 to the SPS playback device 203 over the wireless medium 220, and storing the audio playback messages in the playback stream FIFO memory 321 within the SPS playback device. As a result, decoder 219 within CS playback device 210 must introduce appropriate playback delays to the provided (decoded) audio and video signals, thereby enabling the video output signals provided by video playback circuit 144 to be synchronized with the audio output signals provided by the D/A converters 325 of SPS playback device 230 (as well as the audio output signals provided by audio playback circuit 145 of CS playback device 210). Stated another way, it is necessary for the playback of the decoded video stream and the decoded audio stream to be synchronized in order to provide a desirable viewing experience for the audience. Because the decoder 219 must delay the playback of the decoded audio stream, the playback of the decoded video stream must also be delayed accordingly within the decoder 219 in the direct communication mode.

Indirect Communication Mode

In the indirect communication mode, the CS playback device 210 receives a media stream from media source device 130 (i.e., a conventional mobile device) over wireless medium 120. In this mode, the media source device 130 initially establishes a secure communication channel with CS playback device 210 over the wireless medium 120. As described above, this secure communication channel is established by exchanging setup messages that include the secrets of the CS playback device 210 (e.g., using the IEEE 802.11 protocols as specified above). In one embodiment, the secure communication channel is established by determining a session key based on the secrets of the CS playback device 210.

The hardware, protocol and stack software 231 used by the SPS playback device 230 is identical to the hardware, protocol and stack software 131 used by the media source device 130 and the hardware, protocol and stack software 211 used by CS playback device 210. As a result, the SPS playback device 230 is able to passively monitor and understand the setup messages exchanged by the media source device 130 and the CS playback device 210. In accordance with one embodiment, the SPS playback device 230 uses the secrets of the CS playback device 210 (which are stored in the cache 233) to detect the successful establishment of the secure communication channel between the media source device 130 and the CS playback device 210. More specifically, the SPS playback device 230 is able to determine the session key established by the media source device 130 and the CS playback device 210 using the secrets of the CS playback device 210, and use this session key to 'snoop' on the messages transmitted by the media source device 130 and the CS playback device 210 on the secure communication channel established on wireless medium 120. Note that the SPS playback device 230 does not send any messages to the media source device 130 or the CS playback device 210 on the wireless medium 120.

After the secure communication channel is established between media source device 130 and CS playback device 210 (and SPS playback device 230 has obtained the session key of this secure communication channel), media source device 130 transmits a media stream on this secure communication channel via wireless medium 120.

CS playback device 210 receives this transmitted media stream using hardware, protocol and software stack 211, and routes this media stream to decoder 219 within hardware and software for media playback 212. Decoder 219 extracts the video signals and corresponding video timing information (if present) from the received media stream. These video signals and video timing information are provided to video playback circuit 144, which generates synchronized video output signals in response. These synchronized video output signals are transmitted to the corresponding video display 150. The video timing information provided by decoder 219 indicates a 'start time' when playback of a first frame of the video stream begins. This 'start time' indication is provided to CS PLL 217, which activates the CS_CLK signal in synchronism with the 'start time' indication. As a result, the CS_CLK signal is synchronized with the video playback within CS playback device 210. That is, decoding the media stream produces a number of video frames that are played at a specific frame-per-second rate, and also produces a number of audio samples (for a specific number of audio channels) that are played at a specific sampling frequency in response to the CS_CLK signal. The 'start time' of the playback of the first video frame therefore defines the timing of the CS_CLK signal for synchronized audio playback.

Decoder 219 also extracts the audio signals and corresponding audio timing information from the received media stream. These audio signals and audio timing information are provided to audio playback circuit 145. In response, audio playback circuit 145 provides synchronized audio output signals to speaker(s) 151. The audio timing information provided by decoder 219 is provided to CS PLL 217, and is used to specify the frequency of the CS_CLK signal.

As described above, the CS_CLK signal is used to generate the clock messages that are transmitted from CS CCLK channel circuit 216 to the SPS CCLK channel circuit 236 of SPS playback device 230 on wireless medium 220.

Within SPS playback device 230, the CCLK1 generation logic 310 generates the local conductor clock signal CCLK1 in response to the received clock messages and the SPS_CLK1 signal, in the manner described above.

Note that while CS playback device 210 transmits clock messages to SPS playback device 230 during the indirect communication mode, CS playback device 210 does not transmit audio playback messages to SPS playback device 230 during the indirect communication mode, because the SPS playback device 230 will receive the media stream directly from the media source device 130.

More specifically, SPS playback device 230 receives the media stream transmitted by media source device 130 using hardware, protocol and software stack 231, and routes this media stream to decoder 238 within hardware and software for media playback 232. Note that the hardware, protocol and software stack 231 is able to successfully receive the media stream using the session key stored in cache 233. Decoder 238 extracts the audio playback messages from the received media stream, and provides these audio playback messages directly to the playback processor 322 for processing. Within the playback processor 322, the playback executable 323 immediately extracts the appropriate digital audio samples (for the corresponding specific audio channel represented by SPS playback device 230) from the received audio playback messages, and writes these channel-specific digital audio samples into the output sample buffer 324 in response to the SPS_CLK1 signal.

The local conductor clock signal CCLK1 is used to read these digital audio samples out of output sample buffer 324 and to control DACs 325. In this manner, the CS playback device 210 synchronizes the playback of the audio samples from the SPS playback device 230 (and any other SPS playback devices of the cognitive loudspeaker system) in the indirect communication mode. More specifically, the playback of the digital audio samples by SPS playback device 230 is synchronized with the CS_CLK signal generated by CS playback device 210.

Because the CS playback device 210 does not need to transmit audio playback messages to the SPS playback device 230 during the indirect communication mode, bandwidth is advantageously preserved within media playback system 200 (and more specifically, on wireless medium 220). Moreover, because the SPS playback device 230 receives the audio playback messages directly from the media playback device 130, the indirect communication mode advantageously does not incur any extra latency from the mobile source device 130 to the audio playback. As a result, the decoder 219 within CS playback device 210 does not need to introduce playback delays to the decoded audio and video signals in the indirect communication mode.

In the embodiments described above, the CS playback device 210 includes an audio playback circuit 145 which enables the playback of synchronized audio output signals in the manner described above. However, in other embodiments, the CS playback device 210 might not perform audio playback. In such embodiments, CS playback device 210 still needs decoder 219 to decode the audio timing information in order to provide for proper generation of the CS_CLK signal by CS PLL 217.

Also in accordance with the indirect communication mode, the media source device 130 advantageously operates in a conventional manner, without requiring any modifications to playback the media stream via CS playback device 201 and SPS playback device 230.

Alternate Embodiment

Although the embodiments described above require that the secrets of the CS playback device 210 are initially transmitted and stored in the SPS playback device 230, in an alternate embodiment, this is not required.

In such an alternate embodiment, a cognitive loudspeaker system is initially setup and configured between CS playback device 210 and SPS playback device 230 in the manner described above, except the secrets of the CS playback device 210 are not provided to the SPS playback device 230. A secure communication channel is then established between the media source device 130 and the CS playback device 210, using the secrets of the CS playback device 210 to establish a session key for the secure communication channel. After establishing the session key, and before transmitting an acknowledge (ACK) message to the media source device 130 (which indicates that the media source device 130 may begin transmitting messages (i.e., the media stream) on the secure communication channel), the CS playback device 210 transmits a message to the SPS playback device 230 that includes the session key. More specifically, CS playback device 210 transmits the session key to SPS playback device 230 from CS playback channel circuit 215 to SPS playback channel circuit 235 via wireless medium 220. SPS playback device 230 stores the received session key (e.g., in cache memory 233), and uses this session key to decode (snoop) messages subsequently transmitted from media source device 130 to CS playback device 210. After receiving the session key, SPS playback device 230 transmits a message to CS playback device 210, confirming that the session key was successfully received. After CS playback device 210 has received confirmation from each of the SPS playback devices in the cognitive loudspeaker system, CS playback device 210 transmits an ACK message to media source device 130, thereby completing the secure communication channel, whereby media source device 130 may begin transmitting the media stream. CS playback device 210 and SPS playback device 230 process this transmitted media stream in accordance with the indirect communication mode described above. Note that the process of this alternate embodiment advantageously does not require any modification to the conventional media source device 130.

Although the system 200 of FIG. 2 only includes a single SPS playback device 230, it is understood that additional SPS playback devices can be easily added to system to implement more complex audio playback systems. FIG. 4 is a block diagram of a 5.1 surround sound system 400 that includes media source device 130, smart TV 401, left and right front sound production stations (SPSs) 410 and 420, respectively, left and right surround sound production stations 430 and 440, respectively, and subwoofer sound production station 450. Smart TV 401 includes CS playback device 210, video display 150 and center channel speaker 151, which are implemented in the manner described above.

The left and right front SPSs 410 and 420 include SPS playback device adaptors 411 and 421, respectively, and legacy audio equipment 412 and 422, respectively. Each of the SPS playback device adaptors 411 and 421 includes all of the above-described elements of the SPS playback device 230, except for the speaker(s) 239. The legacy audio equipment 412 and 422 includes high-fidelity analog audio equipment (e.g., power amplifiers and loudspeakers).

The left and right surround SPSs 430 and 440 include SPS playback devices 431 and 441, respectively. Each of these SPS playback devices 431 and 441 is identical to the above-described SPS playback device 230. Similarly, the subwoofer SPS 450 includes SPS playback device 451, which is identical to the above-described SPS playback device 230.

The CS playback device 210 performs configuration and setup for all the audio channels of system 400. More specifically, during setup and configuration of the cognitive loudspeaker system, the CS playback device 210 configures the playback executables of SPS playback adaptors 411 and 421 to extract the left and right front audio channels, respectively, from the received audio playback messages. Similarly, the CS playback device 210 configures the playback executables of the SPS playback devices 431 and 441 to extract the surround left and surround right audio channels, respectively, from the received audio playback messages. Finally, the CS playback device 210 configures the playback executable of the SPS playback device 451 to extract the bass audio channel from the received audio playback messages. Note that the CS playback device 210 extracts the center audio channel from the audio playback messages on speaker 151.

The playback executables installed by the CS playback device 210 are further selected in view of the media format of the playback media stream, which may include MPEG4 (AAC), Dolby Atmos or PCM, for example. The playback executables installed by the CS playback device 210 may also include a propriety surround audio coding for emulating the concert effect for music streaming. The playback executables installed by the CS playback device 210 may also provide for room correction.

In one embodiment, the components of system 400 are configured to form an Independent Basic Service Set (IBSS) using the IEEE 802.11 wireless medium, wherein the Smart TV 401 operates as the Access Point (AP) of the IBSS, and the SPSs 410, 420, 430, 440 and 450 are stations (STAs) of the IBSS.

As described above, there are two ways to source audio signals in system 400, including implementing the direct communication mode and implementing the indirect communication mode. In the direct communication mode, audio playback messages are transmitted from the smart TV 401 to the SPSs 410, 420, 430, 440 and 450 directly via the established cognitive loudspeaker system. This is the use case when the smart TV 401 is playing, for example, movie or music from the Internet, DVD, cable TV or Blu-ray player.

In the indirect communication mode, the media source device 130 transmits a media stream on a wireless network, such as an 802.11 WiFi network. In this mode, the smart TV 401 needs to broadcast a message to SPS playback adaptors 411 and 421 and SPS playback devices 431, 441 and 451, informing these devices of the secrets of CS playback device 210 required for authentication, before proceeding to the authentication process with the media source device 130. When the smart TV 401 establishes the secure communication channel with the media source device 130, each of the SPSs 410, 420, 430, 440 and 450 learns the session key of the secure communication channel in the manner described above. As a result, each of the SPSs 410, 420, 430, 440 and 450 is able to extract the necessary playback streams from the media stream transmitted from the media source device 130 to the smart TV 401.

Alternately, the smart TV 401 establishes a session key with the media source device 130 (using the secrets of the smart TV 401), and transmits the session key to each of the SPSs 410, 420, 430, 440 and 450 prior to transmitting an acknowledge (ACK) message to the media source device 130 that enables the media source device 130 to begin transmitting the media stream.

In a particular example, the media source device 130 is a 5G smart phone that includes an audio streaming application that receives a movie stream in the MPEG4 format from a 5G cellular network, and casts the movie stream to the smart TV 401 via a WiFi interface. However, it is understood that the media source device 130 can be implemented using other types of devices such as a laptop computer or a game console. It is further understood that a wireless medium other than WiFi can be used to cast the movie stream in other embodiments.

Although the particular example illustrated by FIG. 4 implements a 5.1 sound system, it is understood that the present invention can be readily expanded to implement other numbers of audio channels, such as those used by 7.1 or 12.2 sound systems.

Although the particular example illustrated by FIG. 4 uses a smart TV 401 to implement the CS playback device 210, it is understood that other devices (such as a smart home device) can be used to implement the CS playback device 210 in other embodiments. In one embodiment, the role of the CS playback device 210 is transferred between devices using the "handover" process described by the '418 Patent.

In the manner described above, the present invention provides methods for constructing a cognitive loudspeaker system capable of operating in response to media streamed from existing mobile devices. The method does not incur any extra latency from the mobile device to the audio playback. The method advantageously consumes very little bandwidth in the wireless medium during playback.

Although the invention has been described in connection with several embodiments, it is understood that this invention is not limited to the embodiments disclosed, but is capable of various modifications, which would be apparent to a person skilled in the art. Accordingly, the present invention is limited only by the following claims.

I claim:

1. A cognitive loudspeaker system comprising:
   a control station (CS) playback device that establishes a secure communication channel with a media source device on a wireless medium, wherein the CS playback device receives and decodes a media stream transmitted from the media source device on the secure communication channel, whereby the CS playback device provides a decoded media stream, wherein the CS playback device generates a playback clock signal based on the decoded media stream, generates playback clock messages in response to the playback clock signal, and transmits these playback clock messages on a wireless communication channel; and
   a first sound production station (SPS) playback device that receives and stores information from the CS playback device, wherein the information enables the first SPS playback device to receive and decode the media stream transmitted from the media source device on the secure communication channel, whereby the first SPS playback device extracts first audio playback messages from the media stream, the first SPS playback device including circuitry for receiving the playback clock messages from the wireless communication channel, clock generation logic for generating a first conductor clock signal in response to the received playback clock messages, and circuitry for processing the first audio playback messages in response to the first conductor clock signal.

2. The cognitive loudspeaker system of claim 1, wherein the playback clock signal is used for playback of the decoded media stream within the CS playback device.

3. The cognitive loudspeaker system of claim 2, wherein the circuitry in the first SPS playback device for processing the first audio playback messages in response to the first conductor clock signal synchronizes playback of the first audio playback messages with the playback clock signal.

4. The cognitive loudspeaker system of claim 1, wherein the information enabling the first SPS playback device to receive and decode the media stream transmitted from the media source device on the secure communication channel comprises secrets of the CS playback device required to establish the secure communication channel with the media source device on the wireless medium.

5. The cognitive loudspeaker system of claim 4, wherein the first SPS playback device uses the secrets to decode messages transmitted between the CS playback device and the media source device on the wireless medium while the CS playback device and the media source device establish the secure communication channel on the wireless medium.

6. The cognitive loudspeaker system of claim 1, wherein the information enabling the first SPS playback device to receive and decode the media stream transmitted from the media source device on the secure communication channel comprises a session key created by the CS playback device and the media source device when establishing the secure communication channel on the wireless medium.

7. The cognitive loudspeaker system of claim 6, wherein the CS playback device transmits the session key to the first SPS playback device before the media source device transmits the media stream on the secure communication channel.

8. The cognitive loudspeaker system of claim 1, further comprising:
   a second SPS playback device that receives information from the CS playback device that enables the second SPS playback device to receive and decode the media stream transmitted from the media source device on the secure communication channel, whereby the second SPS playback device extracts second audio playback messages from the media stream, the second SPS playback device including circuitry for receiving the playback clock messages from the wireless communication channel, clock generation logic for generating a second conductor clock signal in response to the received playback clock messages, and circuitry for processing the second audio playback messages in response to the second conductor clock signal.

9. The cognitive loudspeaker system of claim 8,
   wherein the circuitry in the first SPS playback device for processing the first audio playback messages in response to the first conductor clock signal synchronizes playback of the first audio playback messages with the playback clock signal; and
   wherein the circuitry in the second SPS playback device for processing the second audio playback messages in response to the second conductor clock signal synchronizes playback of the second audio playback messages with the playback clock signal.

10. The cognitive loudspeaker system of claim 1, wherein the clock generation logic generates the first conductor clock signal in response to the received playback clock messages and a local clock signal of the first SPS playback device.

11. The cognitive loudspeaker system of claim 1, wherein the first conductor clock signal is synchronized with the playback clock signal.

12. A method comprising:
    establishing a secure communication channel between a media source device and control station (CS) playback device on a wireless medium;
    receiving and decoding a media stream transmitted from the media source device on the secure communication channel with the CS playback device,
    thereby providing a decoded media stream;
    generating a playback clock signal with the CS playback device based on the decoded media stream;
    generating playback clock messages with the CS playback device in response to the playback clock signal;
    transmitting the playback clock messages on a wireless communication channel;
    transmitting information from the CS playback device to a first sound production station (SPS) playback device, wherein the information enables the first SPS playback device to receive and decode the media stream transmitted from the media source device on the secure communication channel;
    receiving and decoding the media stream transmitted from the media source device on the secure communication channel with the first SPS playback device,
    thereby providing first audio playback messages;
    receiving the playback clock messages from the wireless communication channel with the first SPS playback device;
    generating a first conductor clock signal within the first SPS playback device in response to the received playback clock messages; and
    processing the first audio playback messages within the first SPS playback device in response to the first conductor clock signal.

13. The method of claim 12, wherein processing the first audio playback messages within the first SPS playback device in response to the first conductor clock signal synchronizes playback of the first audio playback messages with the playback clock signal.

14. The method of claim 12, wherein the CS playback device plays the decoded media stream in response to the playback clock signal.

15. The method of claim 12, wherein the information enabling the first SPS playback device to receive and decode the media stream transmitted from the media source device on the secure communication channel comprises secrets of the CS playback device required to establish the secure communication with the media source device on the wireless medium.

16. The method of claim 15, wherein the first SPS playback device uses the secrets to decode messages transmitted between the CS playback device and the media source device on the wireless medium while the CS playback device and the media source device establish the secure communication channel on the wireless medium.

17. The method of claim 12, wherein the information enabling the first SPS playback device to receive and decode the media stream transmitted from the media source device on the secure communication channel comprises a session key created by the CS playback device and the media source device when establishing the secure communication channel on the wireless medium.

18. The method of claim 17, wherein the CS playback device transmits the session key to the first SPS playback device before the media source device transmits the media stream on the secure communication channel.

19. The method of claim 12, further comprising:
    transmitting the information from the CS playback device to a second SPS playback device, wherein the information enables the second SPS playback device to receive and decode the media stream transmitted from the media source device on the secure communication channel
    receiving and decoding the media stream transmitted from the media source device on the secure communication channel with the second SPS playback device,
    thereby providing second audio playback messages;
    receiving the playback clock messages from the wireless communication channel with the second SPS playback device;
    generating a second conductor clock signal within the second SPS playback device in response to the received playback clock messages; and
    processing the second audio playback messages within the second SPS playback device in response to the second conductor clock signal.

20. The method of claim 19,
    wherein processing the first audio playback messages in response to the first conductor clock signal in the first SPS playback device synchronizes playback of the first audio playback messages with the playback clock signal; and
    wherein processing the second audio playback messages in response to the second conductor clock signal in the second SPS playback device synchronizes playback of the second audio playback messages with the playback clock signal.

21. The method of claim 12, further comprising generating the first conductor clock signal in response to the received playback clock messages and a local clock signal of the first SPS playback device.

22. The method of claim 12, further comprising synchronizing the first conductor clock signal with playback clock signal.

* * * * *